US009652113B1

(12) United States Patent
Colson et al.

(10) Patent No.: US 9,652,113 B1
(45) Date of Patent: May 16, 2017

(54) MANAGING MULTIPLE OVERLAPPED OR MISSED MEETINGS

(71) Applicant: International Business Machines Corporation, Armonk, NY (US)

(72) Inventors: James C. Colson, Austin, TX (US); Kaleigh M. Colson, Austin, TX (US); Philip G. Fritz, Austin, TX (US); Stephen J. Kenna, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/287,314

(22) Filed: Oct. 6, 2016

(51) Int. Cl.
| | |
|---|---|
| *G06F 3/0481* | (2013.01) |
| *H04L 29/06* | (2006.01) |
| *G06F 3/0485* | (2013.01) |
| *G10L 15/26* | (2006.01) |
| *G10L 15/22* | (2006.01) |
| *G10L 25/63* | (2013.01) |
| *G10L 15/30* | (2013.01) |
| *H04L 12/18* | (2006.01) |
| *G06Q 10/10* | (2012.01) |

(52) U.S. Cl.
CPC .......... *G06F 3/0481* (2013.01); *G06F 3/0485* (2013.01); *G10L 15/22* (2013.01); *G10L 15/26* (2013.01); *G10L 15/30* (2013.01); *G10L 25/63* (2013.01); *H04L 12/1822* (2013.01); *H04L 12/1831* (2013.01); *H04L 65/403* (2013.01); *H04L 65/4015* (2013.01); *G06Q 10/1095* (2013.01)

(58) Field of Classification Search
CPC .................. H04L 12/1822; H04L 12/1831
See application file for complete search history.

(56) References Cited

U.S. PATENT DOCUMENTS

| 6,850,609 B1 * | 2/2005 | Schrage | ............ H04M 3/42221 |
| | | | 379/158 |
| 7,707,256 B2 * | 4/2010 | Rollin | .................... G06Q 10/02 |
| | | | 235/377 |

(Continued)

OTHER PUBLICATIONS

"System for Individualistic Meeting Minutes Consolidation with Intelligent Categorization and Querying Mechanism," ip.com, Apr. 22, 2014, 4 pages.

(Continued)

*Primary Examiner* — Lashonda Jacobs
(74) *Attorney, Agent, or Firm* — Yee & Associates, P.C.; David Zwick

(57) ABSTRACT

Managing multiple overlapped electronic conference meetings is provided. Real time streams of speech data are received from a plurality of overlapping electronic conference meetings a registered user is scheduled to participate in. It is determined that a real time stream of speech data corresponding to an electronic conference meeting includes a trigger. It is determined that the registered user is not currently participating in the electronic conference meeting including the trigger. A notification that includes a selectable control element is sent, via a network, to the registered user regarding the electronic conference meeting along with a transcript of the electronic conference meeting. The registered user is joined to the electronic conference meeting in response to receiving an input selecting the selectable control element.

20 Claims, 3 Drawing Sheets

(56) References Cited

U.S. PATENT DOCUMENTS

| | | | | |
|---|---|---|---|---|
| 7,739,340 | B2* | 6/2010 | Arenburg | G06Q 10/107 379/201.01 |
| 8,346,589 | B1* | 1/2013 | Norton | G06Q 10/1093 705/7.18 |
| 8,589,487 | B1* | 11/2013 | Reeves | H04M 3/567 709/203 |
| 8,594,290 | B2* | 11/2013 | Wolf | H04M 3/567 379/202.01 |
| 8,887,067 | B2 | 11/2014 | Tripathi et al. | |
| 9,031,839 | B2* | 5/2015 | Thorsen | G10L 15/183 704/235 |
| 9,204,098 | B1* | 12/2015 | Cunico | H04N 7/15 |
| 9,256,632 | B2* | 2/2016 | Chan | G11B 27/034 |
| 9,443,518 | B1* | 9/2016 | Gauci | G06F 17/28 |
| 2004/0107101 | A1* | 6/2004 | Eide | G10L 13/10 704/260 |
| 2005/0034079 | A1 | 2/2005 | Gunasekar et al. | |
| 2009/0177469 | A1* | 7/2009 | Findlay | G10L 15/26 704/235 |
| 2009/0316872 | A1* | 12/2009 | Wolf | H04M 3/567 379/202.01 |
| 2010/0158213 | A1* | 6/2010 | Mikan | H04M 3/42221 379/88.14 |
| 2010/0241432 | A1* | 9/2010 | Michaelis | H04L 12/1827 704/260 |
| 2010/0253689 | A1* | 10/2010 | Dinicola | H04M 3/567 345/467 |
| 2011/0112833 | A1* | 5/2011 | Frankel | G10L 15/32 704/235 |
| 2011/0137988 | A1* | 6/2011 | Balogh | G10L 15/26 709/204 |
| 2011/0267419 | A1* | 11/2011 | Quinn | H04N 7/15 348/14.08 |
| 2011/0270609 | A1* | 11/2011 | Jones | H04M 3/56 704/235 |
| 2012/0203551 | A1* | 8/2012 | Lakshmanan | G06Q 10/109 704/235 |
| 2012/0296914 | A1* | 11/2012 | Romanov | G11B 27/034 707/741 |
| 2013/0058471 | A1* | 3/2013 | Garcia | H04M 3/42221 379/202.01 |
| 2013/0063542 | A1* | 3/2013 | Bhat | H04N 7/15 348/14.03 |
| 2014/0136994 | A1* | 5/2014 | Kennedy | G06F 3/0481 715/753 |
| 2014/0198174 | A1* | 7/2014 | Sanso | H04N 7/15 348/14.08 |
| 2014/0222907 | A1* | 8/2014 | Seligmann | H04L 65/1069 709/204 |
| 2014/0229218 | A1* | 8/2014 | Abuelsaad | G06Q 10/1095 705/7.19 |
| 2014/0229471 | A1* | 8/2014 | Galvin, Jr. | G06F 17/3061 707/725 |
| 2014/0325393 | A1 | 10/2014 | Quinn et al. | |
| 2015/0106091 | A1* | 4/2015 | Wetjen | G10L 15/26 704/235 |
| 2015/0121466 | A1 | 4/2015 | Brands et al. | |
| 2015/0350258 | A1* | 12/2015 | Griffin | H04L 65/1093 348/14.08 |
| 2016/0294964 | A1* | 10/2016 | Brune | G06N 99/005 |

OTHER PUBLICATIONS

Skype translator, Wikipedia (main idea p. 1).
Renals, "Case Study: ASR of Multiparty Conversations," Automatic Speech Recognition—ASR Lecture 14, Mar. 2009, 9 pages. (main idea p. 1).
Stolcke et al., "Meeting Recognition and Understanding," SRI International (main idea p. 1).
Tone Analyzer, IBM Watson Developer Cloud.
Personality Insights, IBM Watson Developer Cloud.
"Skype Translator", Wikipedia, last modified Apr. 5, 2016, 2 pages. https://en.wikipedia.org/w/index.php?title=Skype_Translator &oldid=7136824.
Renals, "Case Study: ASR of Multiparty Conversations," Automatic Speech Recognition—ASR Lecture 14, Mar. 2009, 9 pages.
Stolcke et al., "Meeting Recognition and Understanding," SRI International, last modified Nov. 23, 2011, 2 pages. http;//www.speech.sri.com/projects/meetings/.
"Tone Analyzer", IBM Watson Developer Cloud, © 2016 IBM, 3 pages. https://www.ibm.com/smartplanet/us/en/ibmwatson/developercloud/tone-analyzer.html.
"Personality Insights", IBM Watson Developer Cloud, © 2016, 5 pages. https://www.ibm.com/smartplanet/us/en/ibmwatson/developercloud/personality-insights.html.

* cited by examiner

MANAGING MULTIPLE OVERLAPPED OR MISSED MEETINGS

BACKGROUND

1. Field

The disclosure relates generally to electronic conferencing and more specifically to managing multiple overlapped electronic conference meetings occurring at a same time that a registered user is scheduled to participate in.

2. Description of the Related Art

Over the years, companies have grown larger and more spread out geographically. In addition, many employees today do all or at least a portion of their work at home. Since employees may be hundreds or even thousands of miles apart, getting everyone at the same physical location for meetings or training has become impractical for a lot of companies. Consequently, many companies utilize electronic conferencing to conduct meetings instead of traditional face-to-face meetings. Electronic conferencing is a conference in which participants communicate from different locations via telephone equipment and/or video conferencing equipment. Thus, electronic conferencing allows for the real time exchange of information between geographically disparate participants.

SUMMARY

According to one illustrative embodiment, a computer-implemented method for managing multiple overlapped electronic conference meetings is provided. A computer receives real time streams of speech data from a plurality of overlapping electronic conference meetings a registered user is scheduled to participate in. The computer determines that a real time stream of speech data corresponding to an electronic conference meeting includes a trigger. The computer determines that the registered user is not currently participating in the electronic conference meeting including the trigger. The computer sends, via a network, a notification that includes a selectable control element to the registered user regarding the electronic conference meeting along with a transcript of the electronic conference meeting. The computer joins the registered user to the electronic conference meeting in response to receiving an input selecting the selectable control element. According to other illustrative embodiments, a computer system and computer program product for managing multiple overlapped electronic conference meetings are provided.

DETAILED DESCRIPTION

Figure 1:
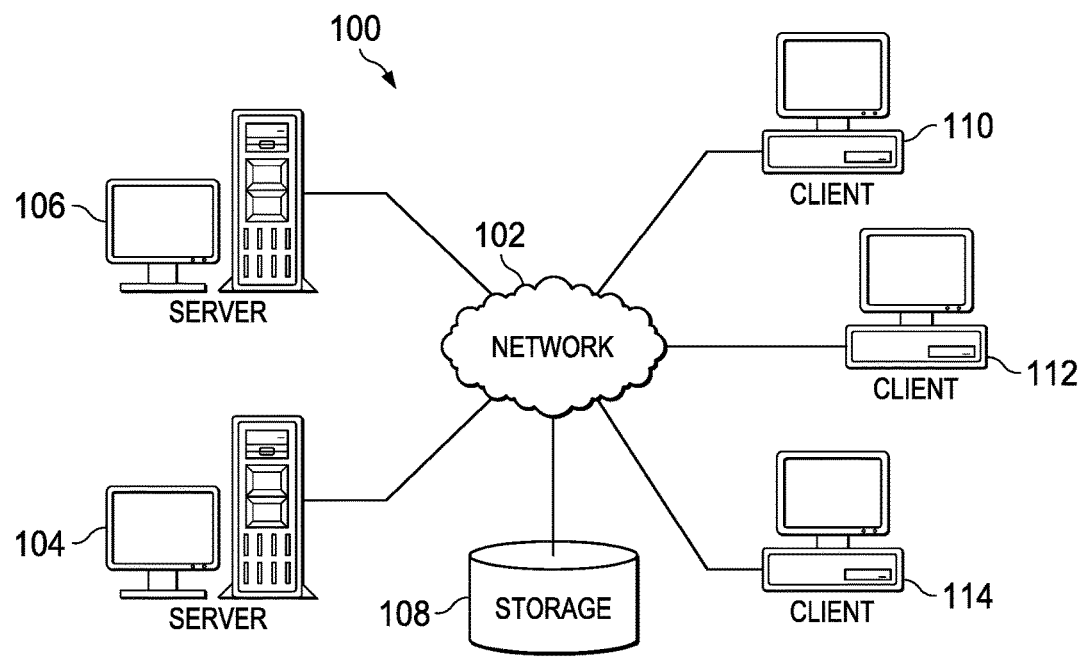
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
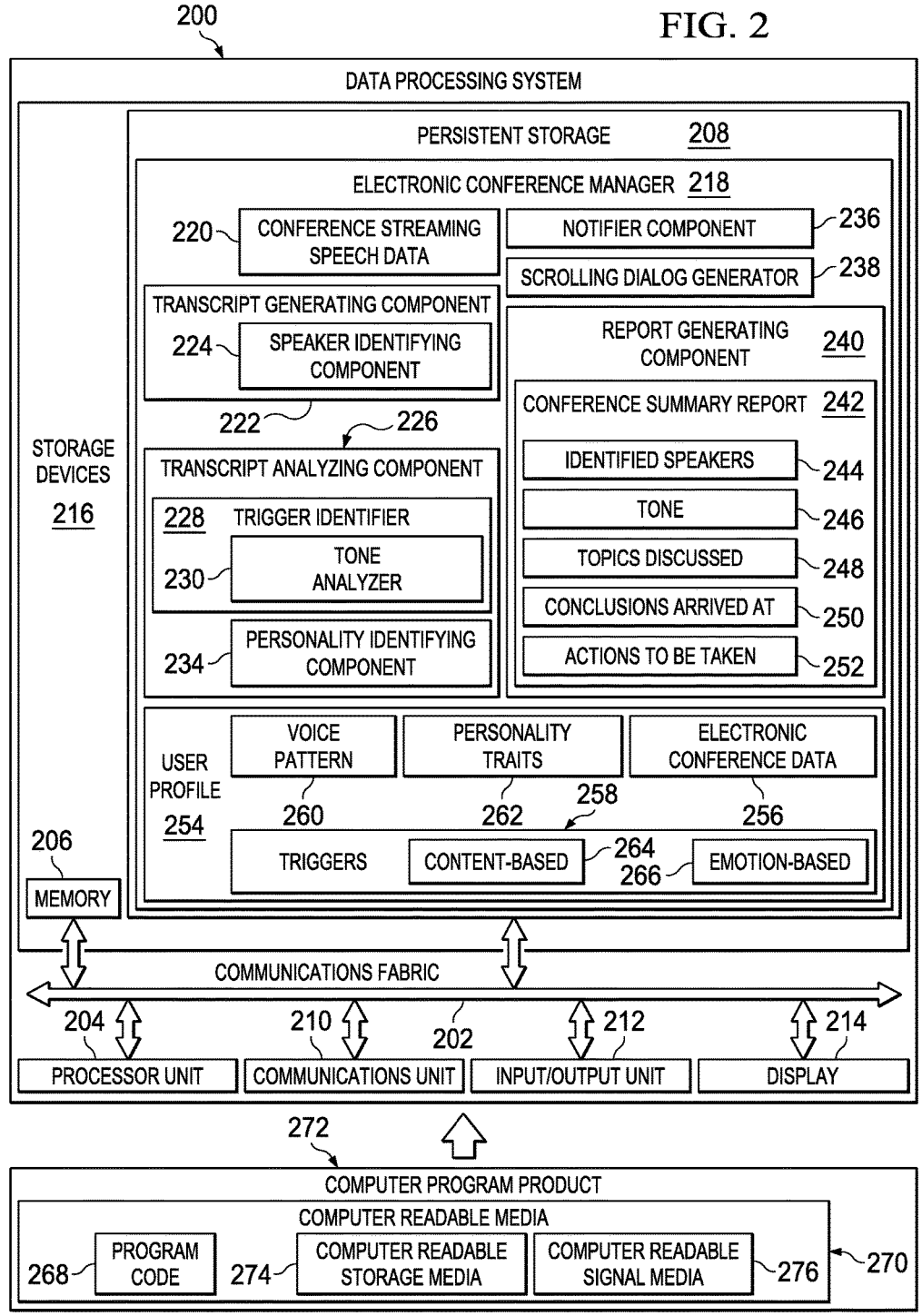
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. Server 104 may provide a set of one or more services to registered users of client devices connected to network 102. For example, server 104 may provide a set of electronic conferencing services to a plurality of registered users. Also, it should be noted that server 104 may represent a plurality of different servers providing a plurality of different electronic conferencing services. An electronic conference may be, for example, a teleconference, a video conference, a virtual reality conference, a holographic conference, or any other type of electronic conference connecting people from different locations via a network, such as network 102.

Server 106 also may provide a set of one or more services to registered users of client devices connected to network 102. For example, server 106 may provide services for managing multiple overlapped electronic conference meetings occurring at a same time that a registered user is scheduled to participate in. Server 106 may receive from server 104, and/or from one or more other servers, electronic conference streaming speech data corresponding to the overlapped electronic conference meetings that the particular registered user is scheduled to participate in and analyze the speech data to determine whether triggers exist within the speech data. In response to finding one or more triggers within the speech data, server 106 may perform one or more actions, such as, for example, send a notification to the registered user that one or more triggers were discovered in a particular electronic conference meeting and send a transcript of the particular electronic conference to the registered user for review in order for the particular user to determine whether to join the particular electronic conference meeting. It should be noted that server 106 also may represent a plurality of different servers for managing multiple overlapped electronic conference meetings occurring at the same time.

Client 110, client 112, and client 114 also connect to network 102. Clients 110, 112, and 114 are clients of server 104 and server 106. Further, server 104 and server 106 may provide information, such as boot files, operating system images, and software applications to clients 110, 112, and 114.

In this example, clients 110, 112, and 114 are illustrated as desktop or personal computers with wire or wireless communication links to network 102. However, it should be noted that clients 110, 112, and 114 are meant as examples only. In other words, clients 110, 112, and 114 may include other types of data processing systems, such as, for example, landline telephones, smart phones, cellular phones, smart watches, personal digital assistants, handheld computers, gaming devices, kiosks, set top boxes, and the like. Registered users of clients 110, 112, and 114 may utilize clients 110, 112, and 114 to access the electronic conference services provided by server 104 and receive the electronic conference management services provided by server 106.

Storage 108 is a network storage device capable of storing any type of data in a structured format or an unstructured format. In addition, storage 108 may represent a set of one or more network storage devices. Storage 108 may store, for example, names and identification numbers for a plurality of different registered users; identification of a plurality of different client devices corresponding to the registered users; user profiles corresponding to each of the registered users; electronic conference transcripts; electronic conference summary reports; and the like. Further, storage 108 may store other data, such as authentication or credential data that may include electronic conference access codes, user names, passwords, and biometric data associated with the plurality of different registered users, for example.

In addition, it should be noted that network data processing system 100 may include any number of additional server devices, client devices, and other devices not shown. Program code located in network data processing system 100 may be stored on a computer readable storage medium and downloaded to a computer or data processing system for use. For example, program code may be stored on a computer readable storage medium on server 104 and downloaded to client 110 over network 102 for use on client 110.

In the depicted example, network data processing system 100 may be implemented as a number of different types of communication networks, such as, for example, a telephone network (e.g., a public switched telephone network, a wireless network, or a private branch exchange), an internet, an intranet, a local area network (LAN), a wide area network (WAN), or any combination thereof. FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 106 in FIG. 1, in which computer readable program code or program instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores electronic conference manager 218. Electronic conference manager 218 monitors and manages multiple overlapped electronic conference meetings occurring at a same time that a registered user is scheduled to participate in. Electronic conference manager 218 may determine that the registered user is scheduled to participate in multiple overlapping electronic conference meetings occurring at a same time by, for example, retrieving data from an electronic calendar and/or a user profile corresponding to the particular registered user. It should be noted that even though electronic conference manager 218 is illustrated as residing in persistent storage 208, in an alternative illustrative embodiment electronic conference manager 218 may be a separate component of data processing system 200. For example, electronic conference manager 218 may be a hardware component coupled to communication fabric 202 or a combination of hardware and software components.

Electronic conference manager 218 receives conference streaming speech data 220 from one or more electronic conferencing servers, such as, for example, server 104 in FIG. 1. Conference streaming speech data 220 represent real time speech data corresponding to each of a plurality of overlapping electronic conference meetings that the particular registered user is scheduled to participate in.

Electronic conference manager 218 may utilize transcript generating component 222 to generate a speech-to-text transcription of each stream of speech data within conference streaming speech data 220. Transcript generating component 222 may utilize, for example, speech recognition software to generate the speech-to-text transcription. Further, transcript generating component 222 may utilize speaker identifying component 224 to identify each individual speaker in each transcript corresponding to each electronic conference meeting. Speaker identifying component 224 may identify different electronic conference speakers using stored and/or learned voice patterns corresponding to the different registered users. In addition, speaker identifying component 224 may identify different speakers by utilizing available metadata corresponding to the different speakers, such as, for example, known telephone numbers the speakers are calling in from.

While transcript generating component 222 generates a transcription for each stream of speech data, electronic conference manager 218 may utilize transcript analyzing component 226 to analyze each transcript in real time as it is generated. Transcript analyzing component 226 may utilize, for example, text parsing and/or natural language processing to analyze the transcripts. In addition, transcript analyzing component 226 may utilize trigger identifier 228 to determine whether one or more triggers are present within a transcript. Triggers may be defined by registered users and/or deduced by a cognitive component of electronic conference manager 218. The cognitive component may deduce the triggers by analyzing data corresponding to registered users, such as, for example, electronic calendar entries, social media interactions, electronic address book entries, and electronic communications, such as emails, text messages, instant messages, chats, and the like. Triggers may be, for example, content-based triggers and/or emotion-based triggers. A content-based trigger may be, for example, a specified keyword or topic of interest. An emotion-based trigger may be, for example, a specified electronic conference speaker sentiment, such as anger or irritation, which may be identified in the speaker's tone of speech.

Trigger identifier 228 may utilize tone analyzer 230 to identify the tone and sentiment of one or more of the electronic conference speakers. Tone analyzer 230 analyzes the tone, such as a harsh tone, soft tone, mild tone, angry tone, and the like, and the sentiment, such as happy, sad, mad, irritated, and the like, of the one or more electronic conference speakers. Based on the analysis, tone analyzer 230 may determine, for example, that a particular speaker, such as a conference organizer or a subject matter expert, is irritated, that an overall general tone of speakers in the electronic conference meeting is heated, or that a particular high priority topic is being discussed during the electronic conference meeting, which may require the registered user's immediate attention. Further, transcript analyzing component 226 may utilize personality identifying component 234 to assess and identify the different personalities of the different electronic conference speakers and determine whether or not a personality of a particular electronic conference speaker requires further attention and analysis by tone analyzer 230.

Electronic conference manager 218 may utilize notifier component 236 to send notifications to registered users based on the findings of transcript analyzing component 226 during the analysis of electronic conference transcripts. A notification may inform a registered user of a determined high priority electronic conference meeting, for example, and recommend that the registered user join the electronic conference if the registered user is not already a participant. Further, the notification may include a transcript of the high priority teleconference meeting so that the registered user may quickly get up to speed regarding the discussion prior to joining the teleconference. The notification also may include a selectable control element that when selected will join the registered user to the electronic conference meeting corresponding to the notification.

Electronic conference manager 218 also may utilize scrolling dialog component 238 to generate a scrolling dialog of each of the plurality of overlapping electronic conference meetings that the registered user is scheduled to participate in and then display each of the generated scrolling dialogs on a client device corresponding to the registered user. Scrolling dialog component 238 may generate each of the scrolling dialogs based on, for example, the output of transcript generating component 222 and speaker identifying component 224. As a result, the registered user has a real time view of discussions occurring between different identified speakers in each of the plurality of overlapping electronic conference meetings that the registered user is scheduled to participate in. Furthermore, scrolling dialog component 238 may include a selectable control element with each of the scrolling dialogs that when selected will join the registered user to the electronic conference meeting corresponding to the selectable control element selected by the registered user.

Moreover, electronic conference manager 218 may utilize report generating component 240 to generate conference summary report 242. Conference summary report 242 represents a summary of each of the plurality of overlapping electronic conference meetings that the registered user is scheduled to participate in. The registered user may use conference summary report 242 to learn about an electronic conference meeting in the plurality of overlapping electronic conference meetings that the registered user was not able to participate in or to review information regarding an electronic conference the registered user was able to participate in.

In this example, conference summary report 242 includes identified speakers 244, tone 246, topics discussed 248, conclusions arrived at 250, and actions to be taken 252. However, it should be noted that different illustrative embodiments may include more or less information in conference summary report 242 than illustrated. Identified speakers 244 is a list of speakers participating in an electronic conference meeting and may be generated by speaker identifying component 224. Tone 246 represents a tone of each individual speaker or a subset of one or more individual speakers within an electronic conference meeting or an overall tone of the electronic conference meeting as a whole. Tone 246 may be generated by tone analyzer 230. Topics discussed 248 represents a list of topics discussed in an electronic conference meeting and may be generated from the output of transcript generating component 222. Conclusions arrived at 250 represents a list of conclusions that speakers participating in an electronic conference meeting arrived at prior to ending the electronic conference meeting and may be generated from the output of transcript generating component 222. Actions to be taken 252 represents a list of possible actions to be taken by a registered user after conclusion of an electronic conference, such as send follow-up emails, schedule a follow-up electronic conference, perform research regarding a particular topic discussed in topics discussed 248, and the like.

In this example, persistent storage also includes user profile 254. User profile 254 represents a plurality of different profiles corresponding to each of a plurality of different registered users. In this example, user profile 254 includes electronic conference data 256, triggers 258, voice pattern 260, and personality traits 262. However, it should be noted that different illustrative embodiments may include more or less information in user profile 254 than illustrated.

Electronic conference data 256 represents information regarding electronic conferences that a registered user is scheduled to participate in. The information may include, for example, electronic conference identifiers, call in information and access codes, scheduled times for the different electronic conferences, invited participants, agendas, topics to be discussed, and the like. Triggers 258 represent a set of one or more triggers defined by a registered user or deduced by a cognitive component of electronic conference manager 218, which electronic conference manager 218 may utilize to identify an electronic conference as a high priority or hot electronic conference, for example. In this example, triggers 258 include content-based triggers 264 and emotion-based triggers 266. Content-based triggers 264 may be, for example, keywords, phrases, expletives, topics of interest, name of the registered user, names of specified participants, specified project names, and the like. Other examples of content-based triggers 264 may be questions, such as "Is Joe dialed in?", "Are we waiting for Joe so we can start?", or "Should Joe be participating in this meeting?" Emotion-based triggers 266 may be, for example, specified sentiments, such as, irritation, anger, and the like, and specified speaker tones, such as harsh tones, high-pitched tones, and the like.

Voice pattern 260 represents a stored set of one or more biometric samples or templates of a registered user's voice. Speaker identifying component 224 may utilize voice pattern 260 to identify the registered user as an active participant in an electronic conference. Similarly, speaker identifying component 224 may utilize voice patterns stored in other registered user profiles to identify the other registered users during electronic conferences.

Personality traits 262 represent user-specified characteristics of a registered user's personality. For example, a registered user may specify that the registered user is generally calm, relaxed, soft spoken, positive, cheerful, and type B. In addition, personality traits 262 may include personality traits of the registered user that personality identifying component 234 may have learned about the registered user over time while analyzing transcripts of different electronic conferences that the registered user was an active participant in. Personality identifying component 234 may utilize personality traits 262 to determine when a registered user is acting contrary to typical personality patterns corresponding to that registered user. For example, if a registered user is speaking very fast in a loud, negative tone, which is contrary to the registered user's typical personality pattern, then personality identifying component 234 may notify tone analyzer 230 to perform a closer analysis of that registered user.

Communications unit 210, in this example, provides for communication with other computers, data processing systems, and devices via a network, such as network 102 in FIG. 1. Communications unit 210 may provide communications using both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (WiFi), bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented program instructions, which may be located in a memory, such as memory 206. These program instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 268 is located in a functional form on computer readable media 270 that is selectively removable and may be loaded onto or transferred to data processing system 200 for running by processor unit 204. Program code 268 and computer readable media 270 form computer program product 272. In one example, computer readable media 270 may be computer readable storage media 274 or computer readable signal media 276. Computer readable storage media 274 may include, for example, an optical or magnetic disc that is inserted or placed into a drive or other device that is part of persistent storage 208 for transfer onto a storage device, such as a hard drive, that is part of persistent storage 208. Computer readable storage media 274 also may take the form of a persistent storage, such as a hard drive, a thumb drive, or a flash memory that is connected to data processing system 200. In some instances, computer readable storage media 274 may not be removable from data processing system 200.

Alternatively, program code 268 may be transferred to data processing system 200 using computer readable signal media 276. Computer readable signal media 276 may be, for example, a propagated data signal containing program code 268. For example, computer readable signal media 276 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 268 may be downloaded over a network to persistent storage 208 from another device or data processing system through computer readable signal media 276 for use within data processing system 200. For instance, program code stored in a computer readable storage media in a data processing system may be downloaded over a network from the data processing system to data processing system 200. The data processing system providing program code 268 may be a server computer, a client computer, or some other device capable of storing and transmitting program code 268.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 274 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Companies continue to be increasingly distributed geographically across the globe and are operating on a 24 hour, 7 day-a-week pace. As a result, a growing number of interactions occur between project team members via electronic conferencing. Additionally, employees are increasingly becoming members of multiple project teams, due to the agile, small team nature of today's agile execution world. This leads to not only an increasing number of electronic conferences, but an increasing number of overlapping or untimely electronic conferences for any given individual. Illustrative embodiments allow a registered user who is scheduled for multiple electronic conferences at the same time, or is otherwise unable to participate in a scheduled electronic conference, to selectively participate in a particular electronic conference on the fly or to quickly understand what information was missed by the registered user during an electronic conference that the registered user was unable to participate in.

In addition, illustrative embodiments may allow a registered user to monitor multiple overlapping electronic conferences at a same time in real time, choosing to switch between the different electronic conference calls based on tone of the group of participants, tone of a particular or key individual participant, keyword or topic references made by participants during an electronic conference, names of participants, or any combination thereof. Further, a registered user may specify and/or illustrative embodiments may cognitively deduce a set of one or more triggers prior to an electronic conference, which allows illustrative embodiments to make a determination as to when to notify the registered user and make a recommendation for the registered user to immediately participate in a particular electronic conference meeting. Furthermore, illustrative embodiments during a post electronic conference transcript analysis may notify or indicate to the registered user that certain follow up actions may need to be performed by that registered user. The set of triggers may be manually defined by the registered user and/or may be automatically defined by illustrative embodiments by analyzing a corpus of information corresponding to the registered user to identify keywords and topics of interest associated with the registered user. Illustrative embodiments may automatically generate a set of triggers personalized to a registered user by analyzing data from a plurality of different sources including, but not limited to, employee directory data, instant messaging logs, project team messaging channels, email threads, browser cached search terms, documents, and electronic conference presentations corresponding to the registered user.

Moreover, illustrative embodiments may generate a speech-to-text transcription of live electronic conference meetings using voice recognition software. Illustrative embodiments also may utilize a speaker identification component to further tag a multi-speaker electronic conference dialog in a transcript to identify who was speaking at each phrase of the discussion.

In addition, illustrative embodiments may display a graphical user interface, which shows a scrolling dialog of the electronic conference participants, on a display of a client device asynchronously to any other activity that a registered user may be performing on the client device. Illustrative embodiments simultaneously generate, analyze, and monitor multiple electronic conference meeting transcripts in real time and may provide a notification, such as a pop up notification in the graphical user interface on a computer or short message service notification on a wireless telephone, to let the registered user know that the registered user's name or other trigger was mentioned by a participant and by which particular participant. The notification also may include a selectable control element that when selected will join the registered user to the electronic conference meeting corresponding to the notification. In a real time scenario, illustrative embodiments provide a registered user with an ability to decide whether to immediately drop what the registered user is currently doing and join the electronic conference based on the notification. In a post electronic conference analysis scenario, illustrative embodiments may provide the registered user with a summary report, which illustrative embodiments may send via email to a client device corresponding to the registered user, so that the registered user may know how often a particular topic or name was mentioned during an electronic conference.

A summary report may include, for example: a) a summary of an electronic conference meeting (e.g., topics discussed, conclusions arrived at, and actions to be performed), as well as identification of sentiment or tone of speakers (e.g., positive, negative, or neutral); b) identification of speakers in the electronic conference meeting; and c) automation of certain actions to be performed (e.g., schedule another electronic conference meeting, send a follow up email, or submit a form based on actions in the electronic conference meeting). A real time electronic conference meeting summary stream may assist a registered user, who is double booked with overlapping electronic conferences, to decide which meeting to participate in based on, for example: a) current content being discussed (e.g., keywords, contextual phrases based on the corpus information, et cetera); b) current tone of one or more participants or the meeting as a whole (e.g., ignore "happy" or "light-hearted" tones and focus on "angry" or "intense" tones); and c) currently identified participants in an electronic conference (e.g., via voice recognition).

By utilizing a tone analyzer integrated with a text-based multi-participant transcript analysis, either in real time or post electronic conference, illustrative embodiment may assess the changing tone of an electronic conference meeting as a whole or a tone of any individual participant actively engaged in the electronic conference meeting as the meeting progresses. Based on a determined tone, either of an individual participant or some "blended" tone of key participants, illustrative embodiments may increase or decrease the priority of an electronic conference meeting and may recommend a set of actions to a registered user based on the determined priority of the electronic conference meeting.

Illustrative embodiments further include a personality assessment of electronic conference participants. By identifying the different personalities of participants, illustrative embodiments may make insightful decisions regarding a tone of a speaker by considering the personality of the speaker who uttered a given name or phrase and the corresponding context in which it was uttered. For example, "Oh, Johnny is always upset or negative, that is just his style. I can ignore that."

Figure 3:
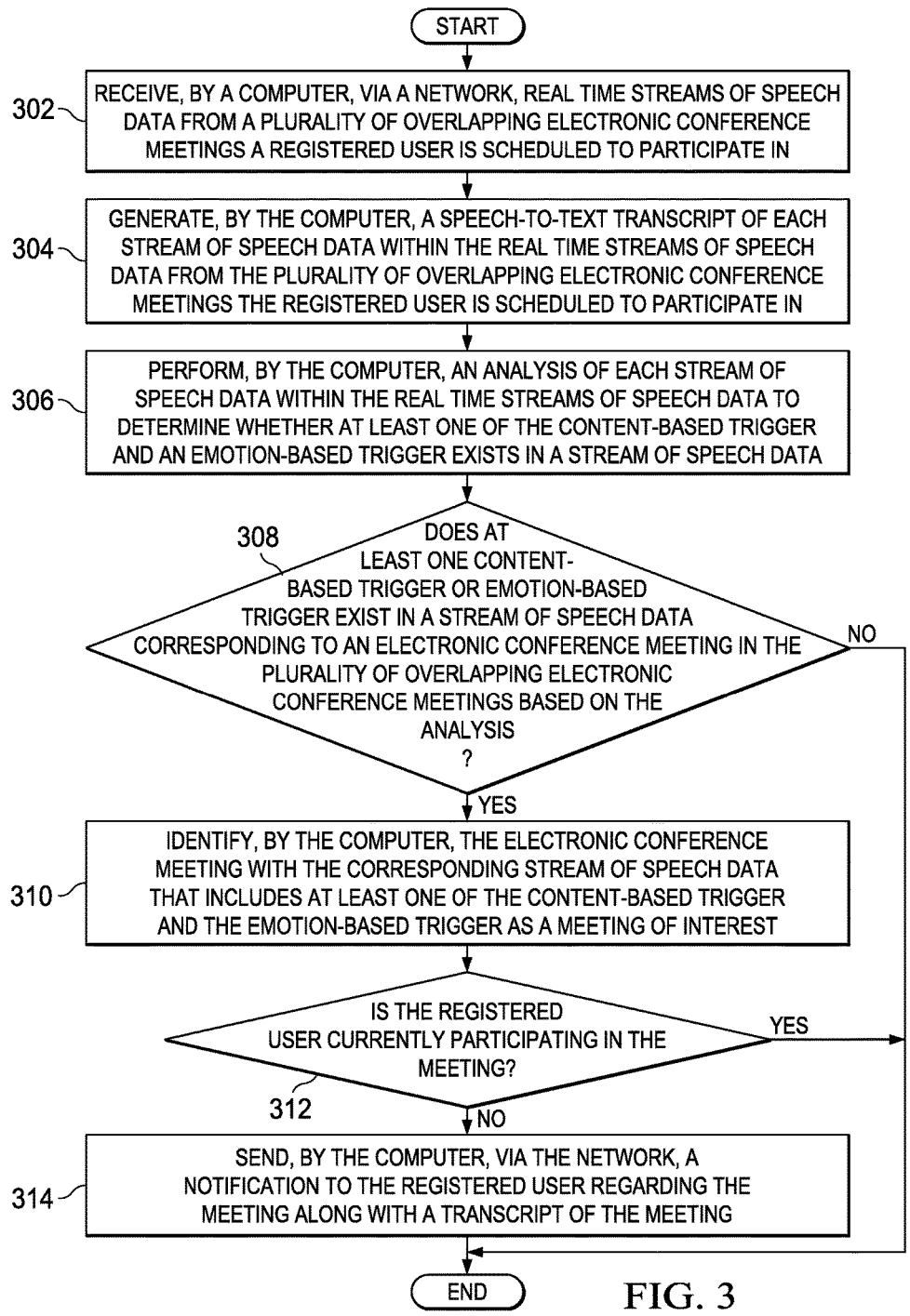
FIG. 3 is a flowchart illustrating a process for managing multiple overlapped teleconference meetings in accordance with an illustrative embodiment.

With reference now to FIG. 3, a flowchart illustrating a process for managing multiple overlapped electronic conference meetings is shown in accordance with an illustrative embodiment. The process shown in FIG. 3 may be implemented in a computer, such as, for example, server 106 in FIG. 1 or data processing system 200 in FIG. 2.

The process begins when the computer receives, via a network, real time streams of speech data from a plurality of overlapping electronic conference meetings a registered user is scheduled to participate in (step 302). The real time streams of speech data from the plurality of overlapping electronic conference meetings may be, for example, conference streaming speech data 220 in FIG. 2. The network may be, for example, network 102 in FIG. 1.

The computer generates a speech-to-text transcript of each stream of speech data within the real time streams of speech data from the plurality of overlapping electronic conference meetings the registered user is scheduled to participate in (step 304). The computer may utilize, for example, a transcript generating component, such as transcript generating component 222 in FIG. 2, to generate the speech-to-text transcript of each stream of speech data. In addition, the computer performs an analysis of each stream of speech data within the real time streams of speech data to determine whether at least one of a content-based trigger and an emotion-based trigger exists in a stream of speech data (step 306). The content-based trigger and the emotion-based trigger may be, for example, content-based trigger 264 and emotion-based trigger 266 in FIG. 2. The computer may utilize, for example, a transcript analyzing component with a trigger identifier, such as transcript analyzing component 226 with trigger identifier 228 in FIG. 2, to analyze each stream of speech data and find content-based triggers and emotion-based triggers within the speech data. The computer also may utilize, for example, a speaker indentifying component, such as speaker identifying component 224 in FIG. 2, to identify each of the speakers participating in a particular electronic conference.

Further, the computer makes a determination as to whether at least one content-based trigger or emotion-based trigger exists in a stream of speech data corresponding to an electronic conference meeting in the plurality of overlapping electronic conference meetings based on the analysis (step 308). If the computer determines that no content-based trigger or emotion-based trigger exists in a stream of speech data within the real time streams of speech data from the plurality of overlapping electronic conference meetings the registered user is scheduled to participate in, no output of step 308, then the process terminates thereafter. If the computer determines that at least one content-based trigger or emotion-based trigger does exist in a stream of speech data corresponding to an electronic conference meeting in the plurality of overlapping electronic conference meetings based on the analysis, yes output of step 308, then the computer identifies the electronic conference meeting with the corresponding stream of speech data that includes at least one of the content-based trigger and the emotion-based trigger as a meeting of interest (step 310).

Afterward, the computer makes a determination as to whether the registered user is currently participating in the meeting (step 312). The computer may utilize, for example, a stored voice pattern, such as voice pattern 260 in FIG. 2, which corresponds to the registered user, to determine whether the registered user is currently participating in the meeting.

If the computer determines that the registered user is currently participating in the meeting, yes output of step 312, then the process terminates thereafter. If the computer determines that the registered user is not currently participating in the meeting, no output of step 312, then the computer sends, via the network, a notification to the registered user regarding the meeting along with a transcript of the meeting (step 314). Thereafter, the process terminates.

Thus, illustrative embodiments of the present invention provide a computer-implemented method, computer system, and computer program product for managing multiple overlapped electronic conference meetings occurring at a same time that a registered user is scheduled to participate in. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for managing multiple overlapped electronic conference meetings, the computer-implemented method comprising:

receiving, by a computer, real time streams of speech data from a plurality of overlapping electronic conference meetings a registered user is scheduled to participate in;

determining, by the computer, that a real time stream of speech data corresponding to an electronic conference meeting includes a trigger;

determining, by the computer, that the registered user is not currently participating in the electronic conference meeting including the trigger;

sending, by the computer, via a network, a notification that includes a selectable control element to the registered user regarding the electronic conference meeting along with a transcript of the electronic conference meeting; and joining, by the computer, the registered user to the electronic conference meeting in response to receiving an input selecting the selectable control element.

2. The computer-implemented method of claim 1 further comprising:

generating, by the computer, a speech-to-text transcript of each stream of speech data within the real time streams of speech data from the plurality of overlapping electronic conference meetings the registered user is scheduled to participate in; and sending, by the computer, the speech-to-text transcript to the registered user.

3. The computer-implemented method of claim 1, wherein the trigger is a content-based trigger.

4. The computer-implemented method of claim 1, wherein the trigger is an emotion-based trigger.

5. The computer-implemented method of claim 4, wherein the emotion-based trigger is a tone of one or more individual speakers in the electronic conference meeting.

6. The computer-implemented method of claim 4, wherein the emotion-based trigger is an overall tone of the electronic conference meeting.

7. The computer-implemented method of claim 1, wherein the trigger is a group consisting of a content-based trigger and an emotion-based trigger.

8. The computer-implemented method of claim 1 further comprising:

identifying, by the computer, each individual speaker in the transcript corresponding to the electronic conference meeting including the trigger.

9. The computer-implemented method of claim 1 further comprising:

identifying, by the computer, a tone of each individual speaker in the transcript corresponding to the electronic conference meeting including the trigger.

10. The computer-implemented method of claim 1 further comprising:

generating, by the computer, a scrolling dialog of each of the plurality of overlapping electronic conference meetings that the registered user is scheduled to participate in; and displaying, by the computer, the scrolling dialog of each of the plurality of overlapping electronic conference meetings on a client device corresponding to the registered user.

11. The computer-implemented method of claim 1 further comprising:

identifying, by the computer, a personality of each individual speaker in the transcript corresponding to the electronic conference meeting including the trigger.

12. The computer-implemented method of claim 1 further comprising:

generating, by the computer, a summary report of the electronic conference meeting including the trigger, wherein the summary report includes at least one of a group consisting of identified speakers, tone, topics discussed, conclusions arrived at, and actions to be taken.

13. A computer system for managing multiple overlapped electronic conference meetings, the computer system comprising:

a bus system;

a storage device connected to the bus system, wherein the storage device stores program instructions; and a processor connected to the bus system, wherein the processor executes the program instructions to:

receive real time streams of speech data from a plurality of overlapping electronic conference meetings a registered user is scheduled to participate in;

determine that a real time stream of speech data corresponding to an electronic conference meeting includes a trigger;

determine that the registered user is not currently participating in the electronic conference meeting including the trigger;

send, via a network, a notification that includes a selectable control element to the registered user regarding the electronic conference meeting along with a transcript of the electronic conference meeting; and join the registered user to the electronic conference meeting in response to receiving an input selecting the selectable control element.

14. A computer program product for managing multiple overlapped electronic conference meetings, the computer program product comprising a computer readable storage medium having program instructions embodied therewith, the program instructions executable by a computer to cause the computer to perform a method comprising:

receiving, by the computer, real time streams of speech data from a plurality of overlapping electronic conference meetings a registered user is scheduled to participate in;

determining, by the computer, that a real time stream of speech data corresponding to an electronic conference meeting includes a trigger;

determining, by the computer, that the registered user is not currently participating in the electronic conference meeting including the trigger;

sending, by the computer, via a network, a notification that includes a selectable control element to the registered user regarding the electronic conference meeting along with a transcript of the electronic conference meeting; and joining, by the computer, the registered user to the electronic conference meeting in response to receiving an input selecting the selectable control element.

15. The computer program product of claim 14 further comprising:

generating, by the computer, a speech-to-text transcript of each stream of speech data within the real time streams of speech data from the plurality of overlapping electronic conference meetings the registered user is scheduled to participate in; and sending, by the computer, the speech-to-text transcript to the registered user.

16. The computer program product of claim 14, wherein the trigger is at least one of a group consisting of a content-based trigger and an emotion-based trigger.

17. The computer program product of claim 14 further comprising:

identifying, by the computer, each individual speaker in the transcript corresponding to the electronic conference meeting including the trigger.

18. The computer program product of claim 14 further comprising:

identifying, by the computer, a tone of each individual speaker in the transcript corresponding to the electronic conference meeting including the trigger.

19. The computer program product of claim 14 further comprising:

generating, by the computer, a scrolling dialog of each of the plurality of overlapping electronic conference meetings that the registered user is scheduled to participate in; and displaying, by the computer, the scrolling dialog of each of the plurality of overlapping electronic conference meetings on a client device corresponding to the registered user.

20. The computer program product of claim 14 further comprising:

identifying, by the computer, a personality of each individual speaker in the transcript corresponding to the electronic conference meeting including the trigger.

* * * * *